United States Patent [19]
Raymond

[11] 3,820,442
[45] June 28, 1974

[54] VARIABLE CUT-OFF INTAKE VALVE SYSTEM

[75] Inventor: Robert J. Raymond, Watertown, Mass.

[73] Assignee: Thermo Electron Corporation, Waltham, Mass.

[22] Filed: May 3, 1972

[21] Appl. No.: 249,789

[52] U.S. Cl................ 91/259, 91/262, 91/325, 137/637.2
[51] Int. Cl............................................. F01l 31/00
[58] Field of Search............. 91/325, 188, 252–259, 91/187, 262; 137/637.2; 257/25

[56] References Cited
UNITED STATES PATENTS

| | | | |
|---|---|---|---|
| 276,528 | 4/1883 | Edson | 91/252 |
| 1,605,657 | 11/1926 | Ellis | 91/252 |
| 2,113,936 | 4/1938 | Fickett et al. | 91/188 |
| 3,529,630 | 9/1970 | Podolsky | 137/637.2 |

FOREIGN PATENTS OR APPLICATIONS

| | | | |
|---|---|---|---|
| 154,176 | 7/1952 | Australia | 91/258 |
| 694,919 | 7/1953 | Great Britain | 251/25 |

Primary Examiner—Paul E. Maslousky
Attorney, Agent, or Firm—James L. Neal

[57] ABSTRACT

An intake valve system for fluid pressure expanders wherein two annular and concentric valves are interposed between a source of pressurized working fluid and an expander cylinder and any pressurized working fluid between the valves can enter the cylinder only when both valves are in the open position. The period of one valve being open is fixed and the period of the other valve being open is variable with respect to the angular position of the crankshaft. Each valve can be provided with an opening to permit the pressure exerted by the working fluid to be equalized on opposing valve surfaces. When the valves have these openings, a fixed means within the inner concentric valve prevents pressurized fluid from entering the cylinder when only one valve is in the closed position.

4 Claims, 4 Drawing Figures

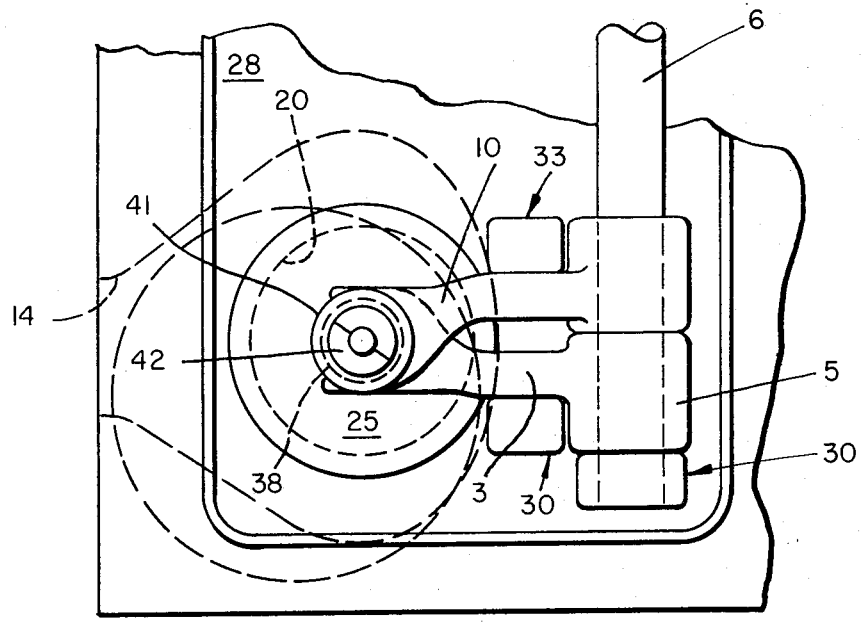
FIG. 2
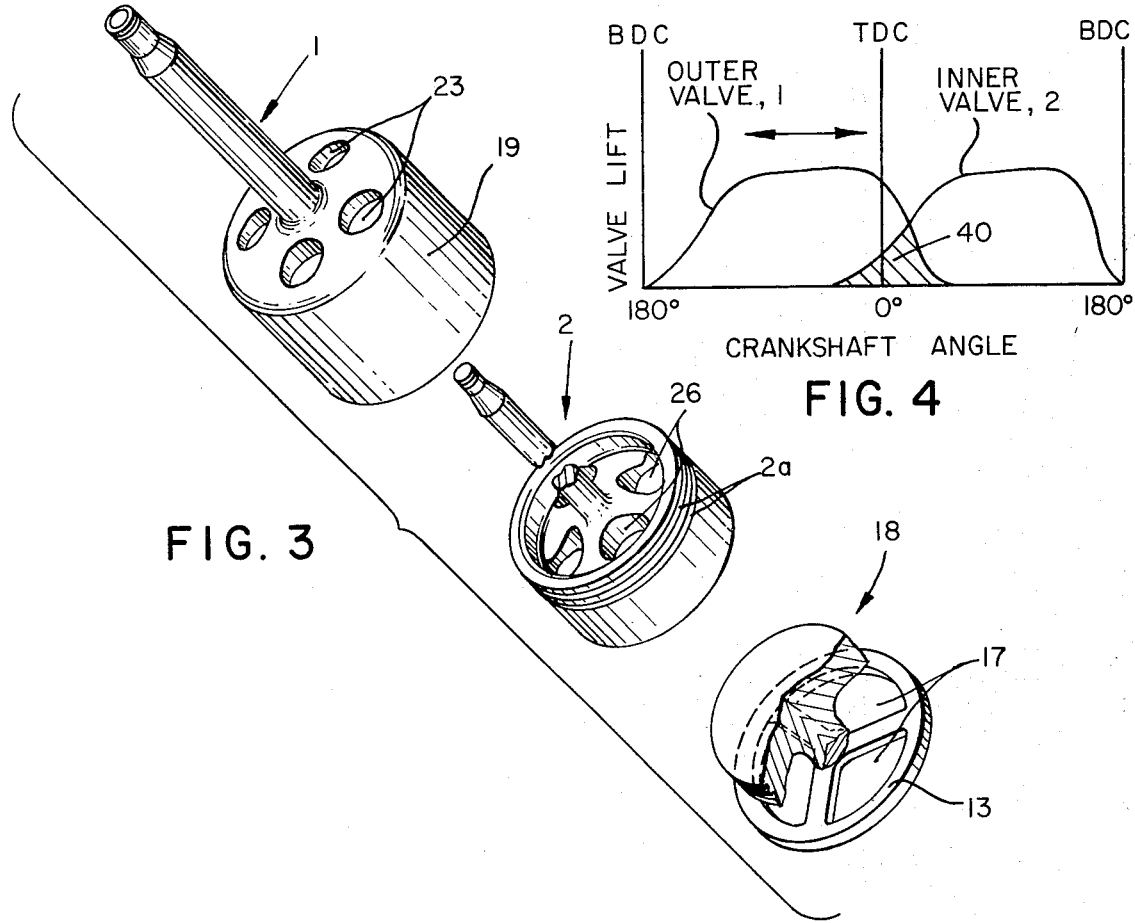
FIG. 3
FIG. 4

VARIABLE CUT-OFF INTAKE VALVE SYSTEM

This invention relates to a valve system suitable for varying the volume of pressurized fluid entering an expander cylinder.

In a Rankine cycle expander wherein a pressurized working fluid such as steam or compressed air is admitted into an expander cylinder, it is most desirable to control power output by varying the volume of working fluid in the cylinder rather than by varying fluid pressure by throttling so that improved efficiency can be attained. Presently this is accomplished by varying the period which the inlet valve system is open between the cylinder and the source of working fluid. One valve system now used employs two valves arranged in series in a fluid conduit connecting the source of working fluid and the cylinder. In this arrangement, the position of the valve adjacent the cylinder varies directly with the crankshaft angle and is fixed with respect thereto. This valve is referred to as the "fixed valve." On the other hand, the position of the valve adjacent the source of working fluid can be varied with respect to the angle of the crankshaft. This valve is referred to as the "variable valve." By varying overlap between the time period the variable valve is open and the time period the fixed valve is open, it is possible to control the time period that the cylinder is in communication with the source of working fluid even for very short periods without encountering severe mechanical stresses normally associated with apparatus caused to change direction at very high speeds.

However, even with the advantages noted above, the prior two-valve system has substantial disadvantages associated therewith which have prevented its commercial use. These disadvantages are due primarily to the relatively large finite volume between the two valves within which pressurized working fluid can be trapped and passed into an engine cylinder when the valve adjacent the cylinder is open. This volume represents the minimum volume of pressurized fluid that can be directed into the cylinder and since this volume is relatively large, in light power situations, as for example when idling, one would require the use of a throttle to reduce fluid pressure thereby rendering the system less efficient than a system not employing a throttle. Furthermore, there is no advantage in locating the fixed valve adjacent the source of fluid pressure and the variable valve adjacent the cylinder since the variable valve would be open during the upstroke of the cylinder and the volume of working fluid between the two valves would be lost through the exhaust outlet. Inefficiencies in operation also result from the enlarged "clearance volume" between the top of the piston at top dead center position and the combined volume of the cylinder above the piston and the volume between the valves since the fixed valve would be open at this piston position. A further important disadvantage in the above-described system is caused by the pressure differential across the head of the fixed valve which results in a substantial force to be overcome by the apparatus used to lift the valve, generally a cam-pushrod-rocker arm system. This excess force greatly accelerates the wear on apparatus formed of normally employed metal alloys and therefore is undesirable.

The present invention provides a two-valve system for regulating the volume of working fluid that enters an expander cylinder comprising two annular and concentric valves positioned so that none or only insubstantial volumes of pressurized working fluid can enter the cylinder when one valve is open. In a preferred embodiment, the valves both enclose an element fixed to the cylinder at a point below a valve seat surface which cooperates with the lowermost surfaces of the valves. Each of the valves is provided with an opening which communicates the top surface of the fixed element with the source of working fluid thereby eliminating any pressure differential across the valve.

The present invention provides a number of substantial advantages. Since little or no pressurized fluid between the two valves, can enter the cylinder when the valve adjacent the cylinder is open, no throttling means need be provided in light power situations and no loss of efficiency is occasioned by excess clearance volume or a loss of pressurized working fluid through the exhaust. In the preferred embodiment, since there is no pressure differential across the valve, the force against which the valve lifting means need be operated is minimized.

The invention will be more fully described with reference to the accompanying drawings.

FIG. 2 is a top view of the apparatus of FIG. 1 taken along line 2—2.

FIG. 3 is an isometric view of the valve system.

FIG. 4 shows the relationship of the position of each valve as function of crankshaft angle.

Figure 1:
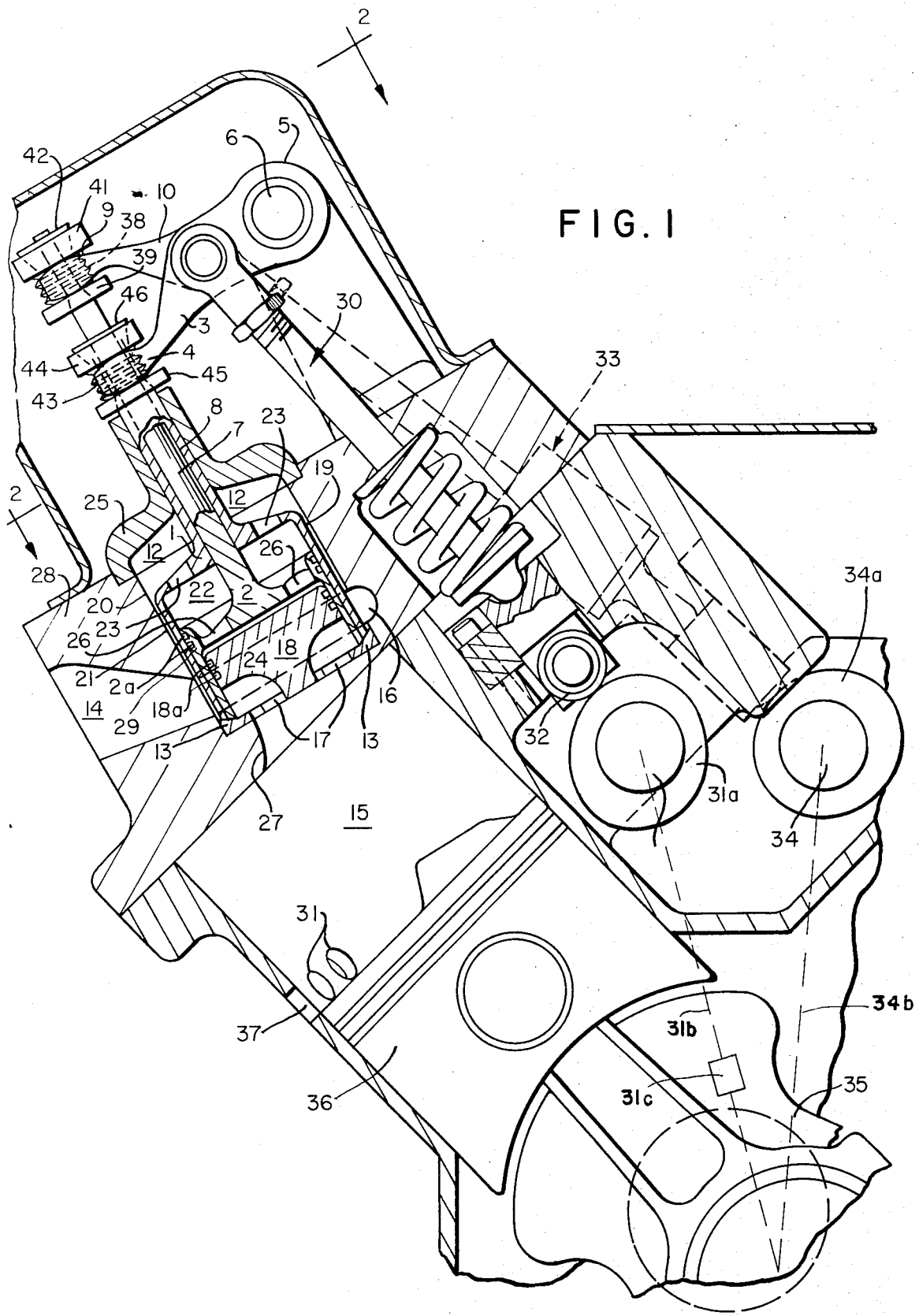
FIG. 1 is a cross-sectional side view showing the valve system.

Referring to the figures, the valve system of this invention comprises two annular and concentric valves 1 and 2 each of which is operated independently by a separate rocker arm 3 or 10. The stem 7 of valve 2 is connected to rocker arm 3 at one end 4 and the other end 5 of the rocker arm 3 is connected pivotally to shaft 6. The stem 8 of valve 1 is connected to one end 9 of rocker arm 10 and the opposite end 11 of rocker arm 10 also is pivotally connected to shaft 6. A spring 38 maintains plates 39 and 41 in tension. Plate 41 is retained on stem 7 by keeper 42. Similarly, spring 43 maintains plates 44 and 45 in tension. Plate 44 is maintained on stem 8 by keeper 46. Both valves 1 and 2 are adapted to move vertically along the central axis of annular chamber 12 defined by valve guard 25 and cylinder head 28. When closed, the bottom surfaces of both valves 1 and 2 cooperate with valve seat 13 to prevent communication between working fluid inlet 14 and cylinder 15. When both valves 1 and 2 are open, working fluid enters cylinder 15 through passage 14, annular passage 16 which surrounds chamber 12, and openings 17 located between fixed element 18 and the valve seat 13. Piston rings 2a and 18a provide the desired sealing between chamber 22 and 24 and cylinder 15.

The outside surface of annular plate 19 of valve 1 is spaced apart from the inside surface 20 of chamber 12 so that when valves 1 and 2 are in the closed position, pressurized working fluid can pass into chamber 12 through annulus 21 and into chamber 22 through the holes 23 in valve 1. The working fluid also can pass into chamber 24, defined by the top surface of the fixed element 18 and the inner surface of valve 2 through holes 26. When annular plates 19 and 29 of valves 1 and 2 are contiguous as shown, no fluid can be trapped there between. Fixed element 18 can be joined to the valve seat 13 or the cylinder wall 27 by any means no long as communication is maintained between the conduit 16 and the cylinder 15. Rocker arm 3 is pivoted about shaft 6 by means of a conventional push rod assembly 30 which is caused to move vertically by cooperation of cam 31 and roller bearing 32. Similarly, rocker arm 10 is caused to pivot around shaft 6 by means of rocker arm assemble 33 which also has a roller bearing which cooperates with cam 34.

The operation of the present invention will be described in terms of a system wherein valve 1 is the fixed valve and valve 2 is the variable valve. It is to be understood that either valve can be the fixed valve; there being no preference. Cam shaft 34 is linked directly to the crankshaft 35 by any conventional means 34b such as a belt or chain so that its relative rotational position is fixed with respect thereto. The cam shaft 31 is linked to the crankshaft 35 by adjustable means 31b that can vary the relative rotational position of the cam shaft 31 with respect to the crankshaft 35. Any such conventional adjustment means such as a phase changer 31c can be employed. Working fluid can enter cylinder 15 only when both valves 1 and 2 are in an open position so that conduit 14 communicates with cylinder 15. The valves 1 and 2 are open only during a specific angular position of the cam shafts 31 or 34 when 31a and 34a cams thereon cooperate with the roller bearings. The valves 1 and 2 are closed in the remaining angular positions of the cam shafts 31 and 34 when the cams 31a and 34a and roller bearings are not in contact. The time period that both valves 1 and 2 are open can be adjusted easily by varying the relative rotational position of the cam shaft 31 with respect to the crankshaft 35 so that the time that valve 2 is open when valve 1 is open can be made shorter or longer as desired.

As shown in FIG. 4, the distance between the valve seat 13 and the bottom surface of the outer valve 1 or inner valve 2 as a function of crankshaft angle is shown. At 180°, the piston 36 is at bottom dead center and at 0°, the piston 36 is at top dead center. The period both valves are open in represented by area 40 which can be extended or diminished by varying the period valve 1 is open as a function of crankshaft angle.

When both valves 1 and 2 are open, working fluid enters conduit 16 and passes through holes 17 into cylinder 15 to force piston 36 into its lowermost position. Upon piston's 36 reaching its lowermost position, the working fluid is exhausted from the cylinder through exhaust holes 37. When the piston 36 is in its lowermost position, either or both valves 1 and 2 are closed to prevent additional working fluid from entering cylinder 15. When valves 1 and 2 are closed, working fluid enters annulus 21, chamber 12, chamber 22 and chamber 24 thereby equalizing the pressure on either side of the valves 1 and 2 so that the force of the working fluid operates on the top surface of fixed element 18. Thus, there is a minimal net force on either valves 1 and 2 which must be overcome by the cam shafts 31 and 34 in order to open either valve.

While the present invention has been described specifically with respect to valves having holes therein for pressure equalization, it is to be understood that such holes are not essential and that the means for reciprocating the valves can be formed from materials adapted to withstand the increased force caused by the pressure difference across the valves. In addition, the valves need not be contiguous as shown in the figures. An annular plate between the valves having suitable piston rings for sealing and having suitable openings to permit working fluid to pass into the cylinder when both valves are open can be provided to reduce valve wear caused by friction. Since any annular plate employed would be relatively thin, the volume of working fluid contained within the openings of the annular plate is insubstantial and does not adversely affect the working of the expander to require a throttle during low power situations.

I claim:

1. A fluid pressure expander comprising a crankshaft, at least one working cylinder having a piston, a working fluid inlet to each cylinder and an exhaust port for each cylinder, an intake valve system for each cylinder having an inner valve element movable between open and closed positions and an outer valve element movable between open and closed positions, said valve elements being annular, concentric, contiguous and located within a common housing, fixed valve seat means cooperating with said valve elements for allowing a substantial volume of a pressurized working fluid to enter said cylinder only when both of said valve elements are in open position, each of said valves being adapted to reciprocate independently along a common axis, means forming an opening in each valve element to equalize working fluid pressure on opposing surfaces thereof, means for fixing the open period of one of said valve elements with respect to the angular position of said crankshaft, second means for varying the open period of the other of said valve elements with respect to the angular position of said crankshaft, and a fixed means within the inner valve element forming with said valve seat means a passageway for pressurized working fluid when both valve elements are in open position.

2. The expander of claim 1 further comprising substantially fluid tight sealing means between said inner and outer valve elements.

3. The expander of claim 2 further comprising substantially fluid tight sealing means intermediate said inner valve element and said fixed means within said inner valve element.

4. The expander of claim 3 wherein said means forming an opening in each valve element comprises a continuously open passageway in fluid communication with said working fluid inlet.

* * * * *